(12) United States Patent
Mitchell

(10) Patent No.: US 6,799,899 B2
(45) Date of Patent: Oct. 5, 2004

(54) FIBER BUNDLE ALIGNMENT

(75) Inventor: Cameron Mitchell, Tucson, AZ (US)

(73) Assignee: Spectra-Physics, Tucson, AZ (US)

( * ) Notice: Subject to any disclaimer, the term of this patent is extended or adjusted under 35 U.S.C. 154(b) by 178 days.

(21) Appl. No.: 10/207,369

(22) Filed: Jul. 30, 2002

(65) Prior Publication Data

US 2003/0223702 A1 Dec. 4, 2003

Related U.S. Application Data

(60) Provisional application No. 60/386,065, filed on Jun. 4, 2002.

(51) Int. Cl.[7] .................................................. G02B 6/36
(52) U.S. Cl. ............................. 385/76; 385/56; 385/60; 385/70; 385/72
(58) Field of Search ............................. 385/76, 56, 60, 385/70, 72

(56) References Cited

U.S. PATENT DOCUMENTS

| | | | |
|---|---|---|---|
| 3,790,791 A | * 2/1974 | Anderson | 250/227.24 |
| 4,119,363 A | 10/1978 | Camlibel et al. | 350/96.2 |
| 4,820,010 A | 4/1989 | Scifres et al. | 350/96.15 |
| 4,865,410 A | 9/1989 | Estrada et al. | 380/96.2 |
| 5,852,692 A | 12/1998 | Nightingale et al. | 385/43 |
| 6,027,256 A | 2/2000 | Nightingale et al. | 385/92 |
| 6,061,374 A | 5/2000 | Nightingale et al. | 372/43 |
| 6,062,739 A | 5/2000 | Blake et al. | 385/76 |

\* cited by examiner

*Primary Examiner*—Dean A. Reichard
*Assistant Examiner*—Jinhee Lee
(74) *Attorney, Agent, or Firm*—Howard R. Popper

(57) ABSTRACT

A fiber optic clamp assembly for use with an ultra-precision translation stage to precisely align a fiber optical bundle with a laser diode mounted in a sealable enclosure, comprising a housing for receiving the fiber bundle, a flexible seal positionable between said housing and said enclosure; and a pressure collar for urging the seal against the enclosure, said collar being freely movable within the housing so as not to load the translation stage when the housing is being moved by the translation stage to align said bundle with said laser diode and thereafter being movable to compress the flexible seal without disturbing the alignment.

2 Claims, 3 Drawing Sheets

FIBER BUNDLE ALIGNMENT

REFERENCE TO RELATED APPLICATION

Applicant hereby claims the benefit under Section 119(e) of the Provisional Patent application No. 60/386,065 filed Jun. 4, 2002.

FIELD OF THE INVENTION

This invention relates to laser diode assemblies and, more particularly, to the alignment of the output coupling optical fiber with the laser diode source through a sealed housing.

BACKGROUND OF THE PRIOR ART

The alignment of an output optical fiber with a laser diode housed in a sealable or hermetically sealed enclosure is a difficult problem. One approach disclosed in U.S. Pat. No. 4,119,363 involves first accurately locating the diode within the enclosure adjacent to an oversized opening. Next, the fiber is threaded through a flanged tube having a conical constriction which centers the fiber within the tube followed by soldering the fiber within the tube, advantageously using a solder preform. Finally, the flanged tube is positioned at the oversized opening in the enclosure, aligned to the diode and the flange soldered to the enclosure. Obviously, the need for two soldering operations increases the expense of fabrication. And while this approach may be satisfactory for aligning a single optical fiber to a laser diode, it is not applicable to the alignment of a plurality of optical fibers.

An approach that is more applicable to the alignment of multiple optical fibers is shown in U.S. Pat. No. 6,061,374. In this approach the ends of the plurality of optical fibers are positioned in respective V-grooves of an alignment block which is accurately positioned within the enclosure with respect to a multiple emitter laser diode. The other ends of the fibers are gathered into a cylindrical bundle and brought out through a circular hole in the enclosure which may be conventionally sealed.

An alternative approach to the alignment of multiple optical fibers is depicted in FIG. 1 in which the parallel fibers are mounted in an elongated assembly external to the enclosure. The fiber optic assembly is then clamped to the enclosure using an O-ring seal. Sufficient clamping force must be applied to compress the O-ring by approximately 20% to provide an adequate degree of sealing.

It is to be appreciated that the accurate alignment to the laser diode of either a single fiber optic or an assembly of parallel fibers requires the use of a manipulative mechanism sometimes referred to as an ultra-precision translation stage that is capable of locating the parts to be assembled with sub micron accuracy. Illustrative ultra-precision translation stages are available from Newport, Inc., Irvine, Calif. An ultra-precision translation stage operates most accurately when the parts to be moved do not "load" the translation mechanism. On the other hand the compression of an O-ring sufficiently to make an effective seal requires the application of force that may load the translational mechanism enough to affect the accuracy with which it moves the parts to be aligned.

SUMMARY OF THE INVENTION

In accordance with an illustrative embodiment of the invention, a fiber optic clamp assembly is provided which permits precise alignment of a fiber bundle with a laser diode mounted in a sealable enclosure. Using an ultra-precision translation stage such alignment is achievable with a sub-micron degree of accuracy. The precise alignment is facilitated by removing from the ultra-precision translation stage any load occasioned by the need to compress the enclosure seal. When the fiber bundle is fully aligned with the laser diode of the enclosure, the ultra-precision translation stage is locked and the clamp assembly made up to the laser diode enclosure. In accordance with an aspect of the illustrative embodiment, the enclosure seal comprises a flexible seal having an O-ring cross-section and a compression collar slidably mounted in the clamp assembly and which is kept out of contact with the O-ring while the translation stage is being moved to align the parts. Once the translation stage is locked, the compression collar is made up to compress the O-ring against the enclosure to effect the sealing of the clamp assembly to the enclosure without disturbing the alignment of fiber optic bundle with the laser diode.

BRIEF DESCRIPTION OF THE DRAWING

The foregoing and other objects and features of the invention may become more apparent from a reading of the ensuing description together with the drawing in which.

DESCRIPTION

Figure 1:
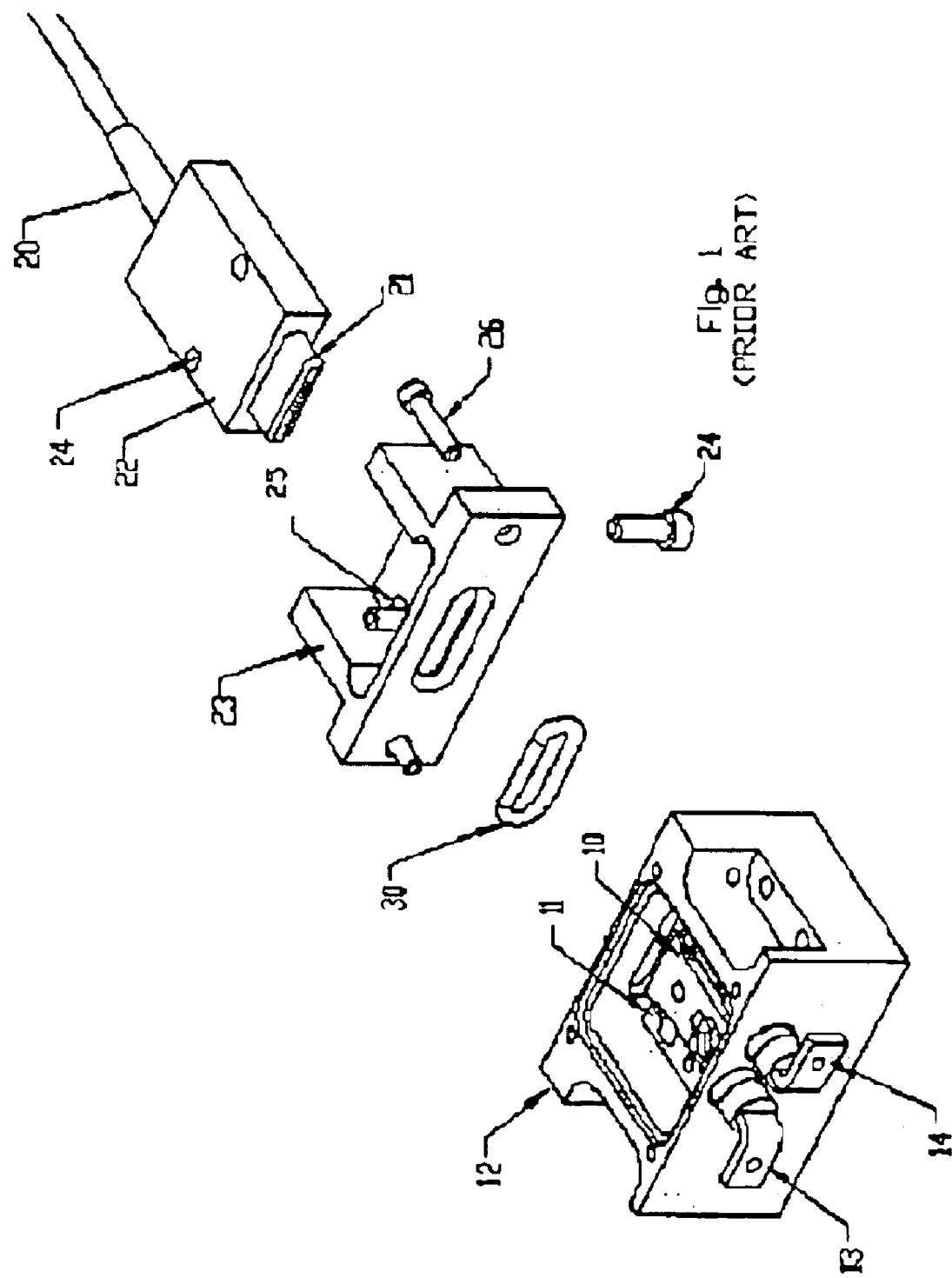
FIG. 1 shows a prior art fiber optic clamp assembly for mating a fiber optic bundle to a sealable enclosure containing a laser diode.

Referring to FIG. 1, a laser diode 10 atop a heat sink 11 is mounted on the floor of a sealable enclosure 12. Enclosure 12 is typically machined from a solid block of metal such as copper. Electrical connections 13 and 14 to laser diode 10 are brought through the rear wall 12R of enclosure 12 through insulating sleeves, 13S, 14S. The front wall 12F of enclosure 12 has an opening to permit light beams exiting from laser diode 10 to be coupled to a bundle of optical fibers 20. Typically the bundle of optical fibers 20 is arranged into a linear array 21 in connector 22 so as to face the linear array of emitters of laser diode 10. Connector 22 is affixed to clamp 23 by screws 24.

Typically, the enclosure 12 is held fixed on an optical bench (not shown) on which is mounted an ultra-precision translator having three degrees of freedom (schematically represented by axes X, Y, and Z) which is capable of moving clamp 23 and connector 22 with respect to enclosure 12 so that the linear array of optical fibers 21 is maximally aligned with the emitters of laser diode 10. Alignment may advantageously be facilitated by energizing conductors 13, 14 to cause laser diode 10 to emit a light beam. A detector (not shown) at the remote end of fiber bundle 20 detects the light beam. When the detector reads maximum amplitude, screws 26 are made up. Usually, screws 26 are made up so that the flat face of clamp 23 is flush against the flat face of enclosure 12. When so made up, O-ring 30 is compressed, thereby sealing the clamp and fiber bundle to enclosure 12.

Unfortunately, the typical ultra-precision translator functions with maximum translational accuracy only when it is very lightly loaded and requiring the translator stage to compress an O-ring seal imposes a significant load which may be sufficient to affect the alignment of the optical fiber bundle with the laser diode. If, on the other hand, screws 26 are not made up to bring the clump face against the enclosure face the rigidity of the connection is compromised and, in the worst case, the O-ring may not be compressed at all.

Figure 2:
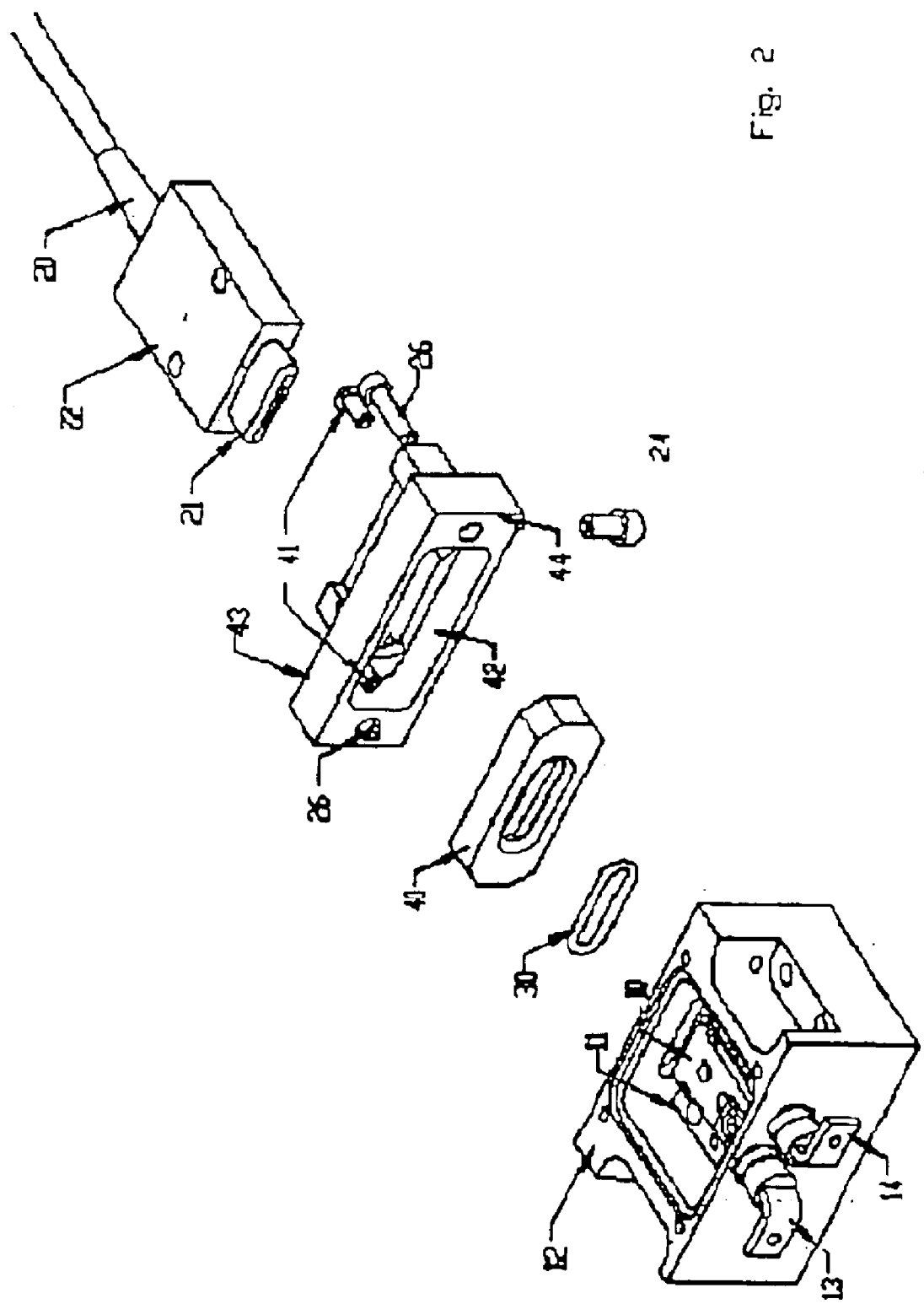
FIG. 2 shows an isometric exploded view of an illustrative embodiment of the invention.
Figure 3:
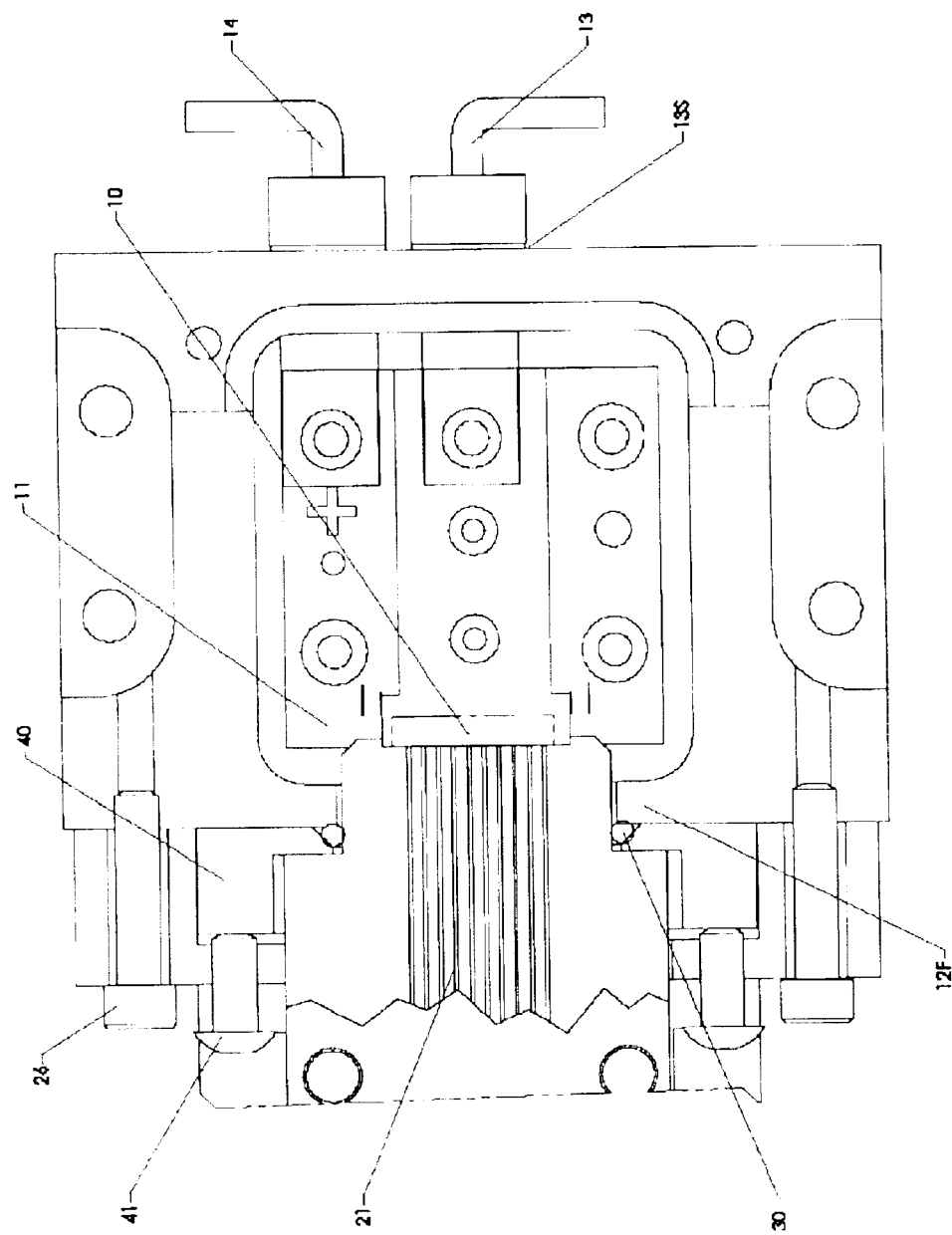
FIG. 3 shows details of the FIG. 2 embodiment in plan view.

The foregoing problems are solved and an inventive solution is achieved as shown in FIG. 2 by including in a recess 44 of housing clamp assembly 43 a slidably mounted compression collar 40 which is held out of contact with O-ring seal 30 until the translator stage completes the alignment of optical fiber bundle 20 with laser diode 10. When the bundle of optical fibers is correctly aligned with laser diode 10, screws 26 are made up to bring the front flat face 44 of clamp 43 flush against the flat face of enclosure 12. Then screws 41 are made up to urge compression collar 40 against O-ring 30 at least until the desired degree of compression is achieved, illustratively 20%. Advantageously, the length of screws 26 may be controlled in coordination with the thickness of O-ring 30 so that the heads of screws 26 bottom against clamp 24 when the desired degree of O-ring compression is achieved.

What has been described is deemed to be illustrative of the principles of the invention. Further and other modifications may be made by those skilled in the art without, however, departing from the spirit and scope of the invention.

What is claimed is:

1. A fiber optic clamp assembly for precisely aligning a fiber bundle with a laser diode in a sealable enclosure, comprising:

a housing clamp (43) for receiving a fiber bundle, said clamp having a recess 42;

a gasket seal (30) positionable between said housing clamp and said enclosure; and a pressure collar (40) slidably mounted in said recess facing said enclosure, said recess maintaining said pressure collar slidably free of and out of contact with said seal until said fiber bundle is aligned with said laser diode, said pressure collar thereafter being urgable against said soul.

2. A method of aligning the axis of a fiber optic bundle in a housing with a laser diode mounted in an O-ring sealable enclosure, said housing having a recess holding a slidable movable pressure collar, said collar being axially urgable against said O-ring, comprising the steps of:

translating said housing relative to said sealable enclosure to align said fiber bundle with said laser diode independently of said pressure collar so that said pressure collar remains clear of said O-ring; and thereafter axially urging said pressure collar against said O-ring to compress said O-ring seal to seal said enclosure upon alignment of said bundle with said laser diode.

* * * * *